United States Patent [19]
Lehnhoff

[11] Patent Number: 5,324,090
[45] Date of Patent: Jun. 28, 1994

[54] WINDSHIELD COVER FOR MOTOR VEHICLES

[76] Inventor: Kurt Lehnhoff, Stettiner Str. 29, D 6380 Bad Homburg, Fed. Rep. of Germany

[21] Appl. No.: 54,450

[22] Filed: Feb. 22, 1993

Related U.S. Application Data

[63] Continuation-in-part of Ser. No. 737,886, Jul. 25, 1991, abandoned, which is a continuation of Ser. No. 459,698, Jan. 25, 1990, abandoned.

[30] Foreign Application Priority Data

Aug. 4, 1987 [DE] Fed. Rep. of Germany ... 8710661[U]

[51] Int. Cl.$^5$ ............................................. B60J 11/00
[52] U.S. Cl. ............................ 296/95.1; 296/136; 160/370.2 R; 150/168
[58] Field of Search ............... 296/95.1, 97.7, 97.8, 296/136; 160/370.2; 150/166, 168

[56] References Cited

U.S. PATENT DOCUMENTS

| | | | |
|---|---|---|---|
| 2,821,248 | 1/1958 | Irvine | 160/370.2 |
| 4,671,334 | 6/1987 | Yadegar et al. | 160/370.2 X |
| 4,784,215 | 11/1988 | Sing | 296/95.1 X |
| 4,878,708 | 11/1989 | Champane | 296/97.7 |

*Primary Examiner*—Joseph D. Pape
*Attorney, Agent, or Firm*—W. G. Fasse

[57] ABSTRACT

A windshield cover for protecting the windshield of motor vehicles against the weather i made as a panel constructed of a plastic material. The panel has two outer sheets spaced from each other by a spacing and a plurality of inner webs extending perpendicularly to the outer sheets and interconnecting the two outer sheets to form a channeled panel fairly rigid against a force perpendicularly to the plane of the panel and somewhat flexible to bending around the length of the webs which form a plurality of parallel channels in said spacing between the outer sheets. The inner webs provide mechanical strength against rough wear and tear, and the channels hold air for thermal insulation, especially when at least the upper end of each channel is closed.

10 Claims, 1 Drawing Sheet

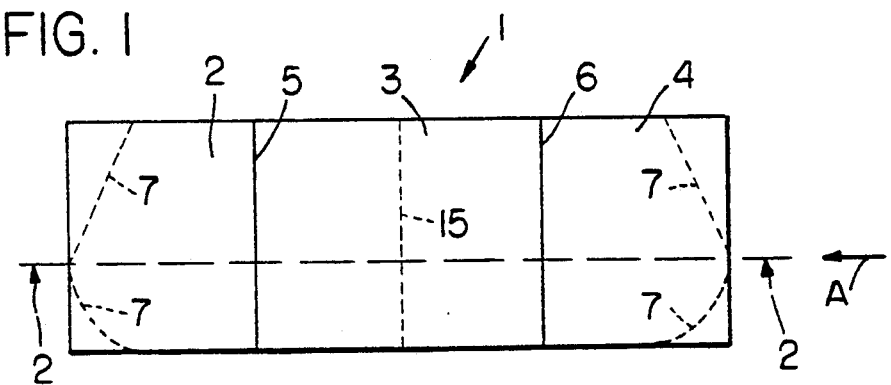
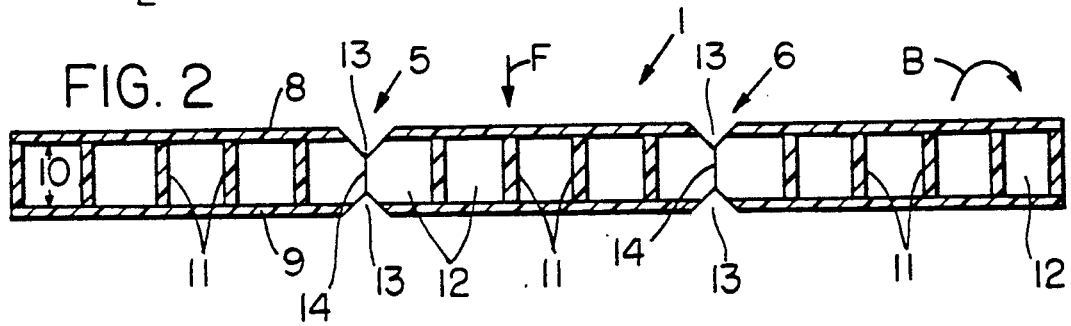
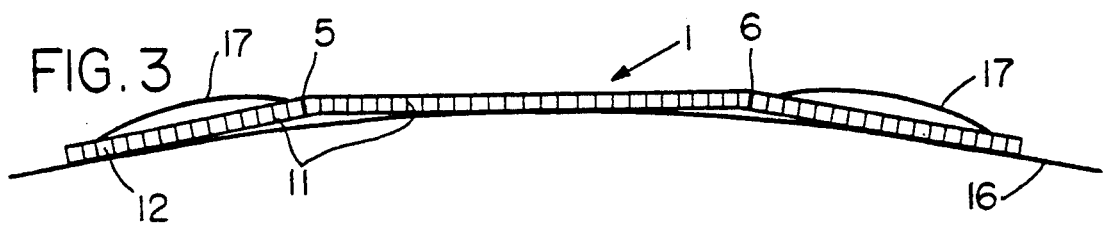

WINDSHIELD COVER FOR MOTOR VEHICLES

CROSS REFERENCE TO RELATED APPLICATION

This application is a continuation-in-part of my co-pending U.S. application Ser. No. 07/737,886, filed Jul. 25, 1991, abandoned which was a File Wrapper Continuation of U.S. application Ser. No. 07/459,698 filed Jan. 25, 1990 abandoned.

FIELD OF THE INVENTION

The invention relates to a cover made of a special plastic material for a windshield or windscreen of a motor vehicle.

BACKGROUND INFORMATION

U.S. Pat. No. 4,671,334 (Yadegar et. al.), issued on Jun. 9, 1987, discloses a vehicle sunshade, which is foldable and collapsible for storage e.g. in the glove compartment. The known sunshade is made of plastic, fiberboard, cardboard or the like, without any hollow spaces.

U.S. Pat. No. 4,878,708 (Champane), issued on Nov. 7, 1989, discloses a vehicle sunshield that is made of resilient corrugated cardboard and constructed for use inside the vehicle next to the windshield. The shield is also foldable.

U.S. Pat. No. 4,784,215 (Sing), issued on Nov. 15, 1988, discloses air inflatable insulating shades mountable inside a passenger car compartment to cover the ceiling and both front and rear window. A separate blower is required to inflate the shades.

There is a need for a windshield cover that will keep snow and ice off the windshield without freezing to the windshield. Thus the protection must be mechanical and thermal. Conventional devices are not very efficient for both purposes simultaneously.

It is also known to use protection films which are stretched over the windshield and are secured in the door frame. Such thin, soft films are cumbersome to handle, since it is difficult to attach the films to the windshield. Besides, there is a tendency of these films to freeze onto the windshield.

OBJECTS OF THE INVENTION

In view of the above it is the aim of the invention to achieve the following objects singly or in combination:
to provide a windshield cover which will provide mechanical protection against snow and ice and thermal insulation year round, especially against heat in summer;
to construct the present windshield cover of a material that will provide the intended protection and insulation, which is sufficiently flexible, yet stiff enough to withstand rough use; and
to construct the cover so that it may be easily attached to and removed from the outside of the windshield.

SUMMARY OF THE INVENTION

According to the invention there is provided a windshield cover for protecting the windshield of motor vehicles against the weather, comprising a panel made of a plastic material, said panel comprising two outer sheets spaced from each other by a spacing and a plurality of inner webs extending perpendicularly to said outer sheets, said inner webs interconnecting said two outer sheets to form a plurality of parallel channels in said spacing, whereby said inner webs provide mechanical strength against rough wear and tear, and wherein said channels hold air for thermal insulation.

The present panel is characterized by a surprising weather resistance, sufficient stiffness against a force perpendicular to the panel plane as well as perpendicularly to the channel length and in the direction of the channel length. The panel is, however, relatively flexible against bending around the channel length, especially where folds or creases are formed in the channel length. Yet, the panel has a very low weight. Simultaneously, an insulation effect is achieved for the present windshield which substantially prevents any freezing-on. This insulation effect is especially pronounced if at least one end of each channel, preferably the upper end, is closed, whereby dead air is trapped in the channels and water cannot enter the channels.

The size of the windshield cover is easily adaptable to the dimension of any windshield of a motor vehicle since the panel material is easily cut. Thus, any number of ready-made sizescan be provided. The panel thickness is so selected that the panel does not collapse when one holds the panel only along one edge.

For easy handling after use, the windshield cover is prefolded or precreased in the channel length direction at least at one preferably two locations so that the resulting panel sections are easily folded together. A preferred embodiment provides that two folds or creases run in the channel length direction. The creases are positioned along one third or one quarter of the total panel length so that the windshield cover better adapts itself to the curvature of the windshield. The folded quarter or one third panel sections rest easily on the center section in a space saving manner.

BRIEF DESCRIPTION OF THE DRAWINGS

In order that the invention may be clearly understood, it will now be described, by way of example, with reference to the accompanying drawings, wherein:

FIG. 1 is a top plan view of a windshield cover according to the invention with two folds or creases;

FIG. 2 is a sectional view on an enlarged scale, along section line 2—2 in FIG. 1;

FIG. 3 is an end view of a cover according to the invention installed between a windshield and the windshield wipers; and FIGS. 4, 5, 6, 7 are side views in the direction of the arrow A in FIG. 1 illustrating several edge or margin constructions.

DETAILED DESCRIPTION OF PREFERRED EXAMPLE EMBODIMENTS AND OF THE BEST MODE OF THE INVENTION

The present panels are made of polymeric plastic materials that are sufficiently weather resistant, such as polyvinyl chloride (PVC), polycarbonates (PC). The panels are produced by conventional extrusion techniques for example.

FIG. 1 shows a panel 1 with three panel sections 2, 3 and 4. The panel sections are interconnected by prefolds or creases 5 and 6. These creases are easily formed by applying pressure lengthwise of a channel or by applying pressure and heat lengthwise of a channel to be described below. The panel edges, especially the panel corners may be trimmed to conform to the configuration of a windshield as indicated by the dashed lines 7.

Referring to FIG. 2 the present panel 1 comprises two outer sheets 8 and 9 spaced from each other by a spacing 10. The outer sheets 8 and 9 are interconnected by a plurality of inner webs 11 extending perpendicularly to the outer sheets. The inner webs interconnect the two outer sheets to form a plurality of parallel channels in the spacing 10. The inner webs 11 due to their perpendicular arrangement provide a substantial stiffness to the panel in the direction of a force F, effective perpendicularly to the plane defined by the panel surface. However, the panel is relatively bendable by a bending moment B effective around the longitudinal extension of the channels especially where the creases 5 and 6 are formed. These creases may form slight depressions 13, where the pressure has been applied. Ribs 14, shorter than the webs 11, preferably interconnect the panel sheets where they are formed into the depressions 13. These ribs 14 may in fact be a crumpled web.

The position of the foldsor creases 5 will depend on the configuration of the windshield. A division into three sections that may comprise two quarter sections and a half section, as shown approximately in FIG. 1 has been found to be effective. However, a single crease 15 may be formed as shown by a dashed line in FIG. 1 or the entire panel length may be divided into three sections of equal width.

The present construction as shown in FIG. 2 must not be confused with conventional corrugated material which does not provide the stiffness nor the flexibility in the desired direction as has been described above with reference to the force F and the bending moment B.

FIG. 3 shows the panel 1 installed on the outside of a windshield 16 and held in place by the spring-action of the windshield wipers 17.

FIG. 4 shows the panel 1 with its edges 18 and 19 open. Assuming that the cover is so installed that the edge 18 forms an upper edge and the edge 19 forms a lower edge, air circulation through the panel will take place because it has been found that, when the panel is exposed to the sun, air, that has been warmed up, will tend to travel upwardly out of the open edge 18. This circulation provides a certain cooling effect in the summer.

FIG. 5 shows a panel 1A, in which at least one edge is closed as shown at 20, for example, by simply welding the cut edge of the panel at 21. A heat and pressure application is sufficient for this purpose. The required temperature and pressure is usually provided by the manufacturer of the panel material.

The embodiment shown in FIG. 5 should be installed with the closed edge 20 pointing upwardly, whereby air in the panel is trapped for a good thermal insulation. Simultaneously, moisture or rather rain and snow can- not enter into the channels when the upper edge is closed tight.

FIG. 6 shows a panel 1B in which both edges are closed tight at 22 and 23.

FIG. 7 shows a panel 1C in which one edge is closed by an adhesive tape 24. Good quality duct tape can be used for this purpose.

The thickness of the web can be about 3 to 5 mm for all practical purposes.

Although the invention has been described with reference to specific example embodiments, it will be appreciated that it is intended to cover all modifications and equivalents within the scope of the appended claims.

What I claim is:

1. A windshield cover for protecting the windshield of motor vehicles against the weather, comprising a panel made of a plastic material, said panel comprising two outer sheets spaced from each other by a spacing and a plurality of inner webs extending perpendicularly to said outer sheets, said inner webs interconnecting said two outer sheets to form a plurality of parallel channels in said spacing, whereby said inner webs provide mechanical strength against rough wear and tear, and wherein said channels hold air for thermal insulation.

2. The windshield cover of claim 1, wherein said panel comprises at least three panel sections and at least two folds between neighboring panel sections for folding said panel sections together for storage.

3. The windshield cover of claim 1, wherein said channels of said panel are closed at least along an upper edge of said panel for preventing moisture penetration into said channels while trapping air inside said channels for an improved thermal insulation.

4. The windshield cover of claim 1, wherein said channels of said panel are closed along an upper panel edge and along a lower edge of said panel.

5. The windshield cover of claim 1, wherein said outer sheets and said inner webs of said panel are made of a sufficiently stiff, yet flexible plastic material for conforming said panel to the curvature of said windshield.

6. The windshield cover of claim 1, wherein said channels of said panel are welded closed at least along one edge of said panel.

7. The windshield cover of claim 1, further comprising an adhesive strip at least along one edge of said panel for closing at least opened of said channels.

8. The windshield cover of claim 1, wherein at least one end of said channels is open.

9. The windshield cover of claim 1, wherein said folds comprise heat treated, elongated compressed depressions in said outer panel sheets.

10. The windshield cover of claim 9, comprising a rib shorter than said webs, said rib interconnecting said depressions inside said panel.

* * * * *

UNITED STATES PATENT AND TRADEMARK OFFICE
CERTIFICATE OF CORRECTION

PATENT NO. : 5,324,090
DATED : June 28, 1994
INVENTOR(S) : Kurt Lehnhoff

It is certified that error appears in the above-indentified patent and that said Letters Patent is hereby corrected as shown below:

On the title page: Item

[30] add the following Foreign Application Priority Data:
--July 30, 1988 [DE] Fed. Rep. of Germany  PCT/DE88/00473--.
In [57] Abstract line 2, replace "i" by --is--.
Column 2, line 23, replace "sizescan" by --sizes can--.
Column 3, line 22, replace "foldsor" by --folds or--.
Column 4, line 49, (Claim 7), replace "opened" by --one end--.

Signed and Sealed this

Twenty-seventh Day of September, 1994

Attest:

BRUCE LEHMAN

Attesting Officer

Commissioner of Patents and Trademarks